(12) United States Patent
Tanabe et al.

(10) Patent No.: US 8,345,598 B2
(45) Date of Patent: Jan. 1, 2013

(54) MOBILITY MANAGEMENT METHOD AND NETWORK DEVICE

(75) Inventors: Akimichi Tanabe, Kawasaki (JP); Masami Yabusaki, Kashiwa (JP); Katsutoshi Nishida, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 734 days.

(21) Appl. No.: 12/522,091

(22) PCT Filed: Dec. 28, 2007

(86) PCT No.: PCT/JP2007/075270
§ 371 (c)(1),
(2), (4) Date: Sep. 14, 2009

(87) PCT Pub. No.: WO2008/081925
PCT Pub. Date: Jul. 10, 2008

(65) Prior Publication Data
US 2010/0014465 A1     Jan. 21, 2010

(30) Foreign Application Priority Data
Jan. 5, 2007 (JP) .................................. 2007-000795

(51) Int. Cl.
*H04W 4/00* (2009.01)

(52) U.S. Cl. ........................................ 370/328; 370/338
(58) Field of Classification Search .................. None
See application file for complete search history.

(56) References Cited

U.S. PATENT DOCUMENTS
2003/0158938 A1    8/2003 Adatrao et al.

FOREIGN PATENT DOCUMENTS
WO    WO 03/071821 A1    8/2003
WO    WO 2007/051793 A1    5/2007

OTHER PUBLICATIONS

H. Soliman, et al., "Interactions between PMIPv6 and MIPv6: scenarios and related issues draft-giaretta-netlmm-mip-interactions-00", NETLMN Working Group, Apr. 24, 2007, pp. 1-23.
Akimichi Tanabe, et al., "Proposal on the selection procedure either Mobile IP or Proxy Mobile IP", IEICE General Conference 2007, The Institute of Electronics, Information and Communication Engineers, B7-203, Mar. 7, 2007, p. 293 (with English translation).
"cdma2000 Wireless IP Network Standard: Simple IP and Mobile IP Access Services", (3GPP2 X.S0011-002-D, Version 1.0, version dated: Feb. 2006, 1 front page, pp. I-V, pp. 1-88.

*Primary Examiner* — John Blanton
(74) *Attorney, Agent, or Firm* — Oblon, Spivak, McClelland, Maier & Neustadt, L.L.P.

(57) ABSTRACT

A mobility management method includes: notifying, at a mobile terminal, an edge node of a terminal function indicating that the mobile terminal has a Mobile IP client function; instructing, at the edge node, the mobile terminal to perform an operation for mobility management by using not an MIP function but an IP function when the edge node has a PMIP client function; performing, at the mobile terminal, the operation for mobility management by using the IP function in response to the instruction from the edge node; and performing, the edge node, the operation for mobility management by using the PMIP client function.

2 Claims, 18 Drawing Sheets

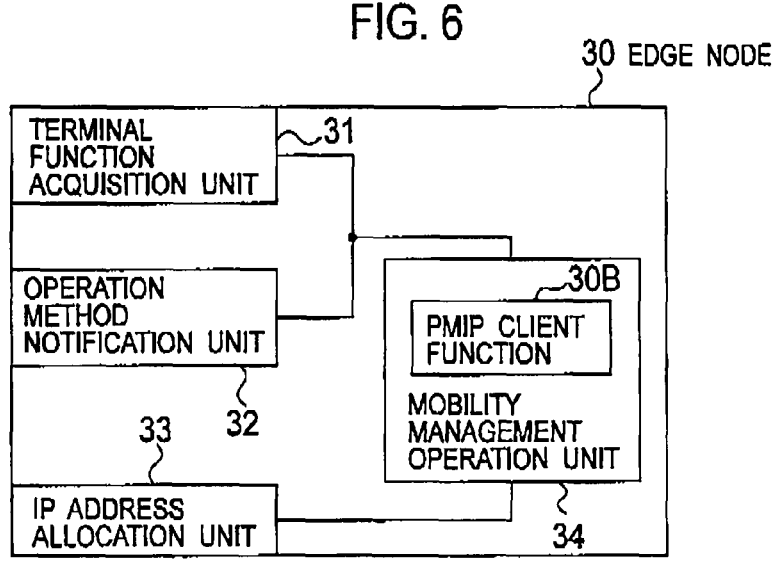
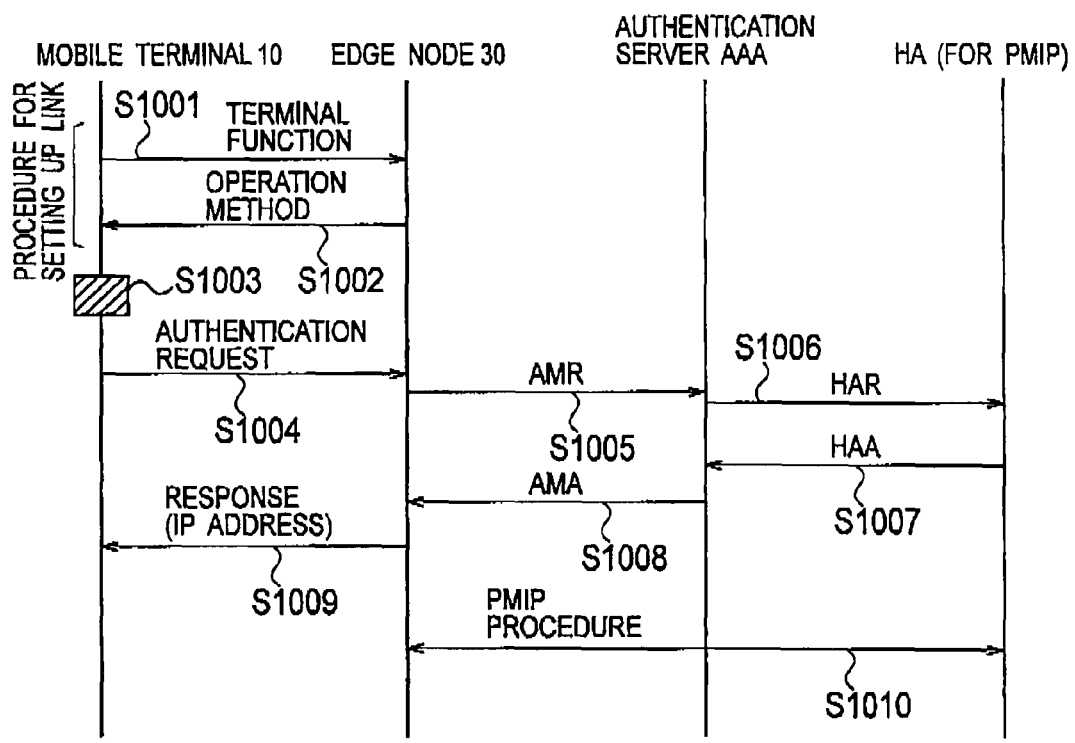

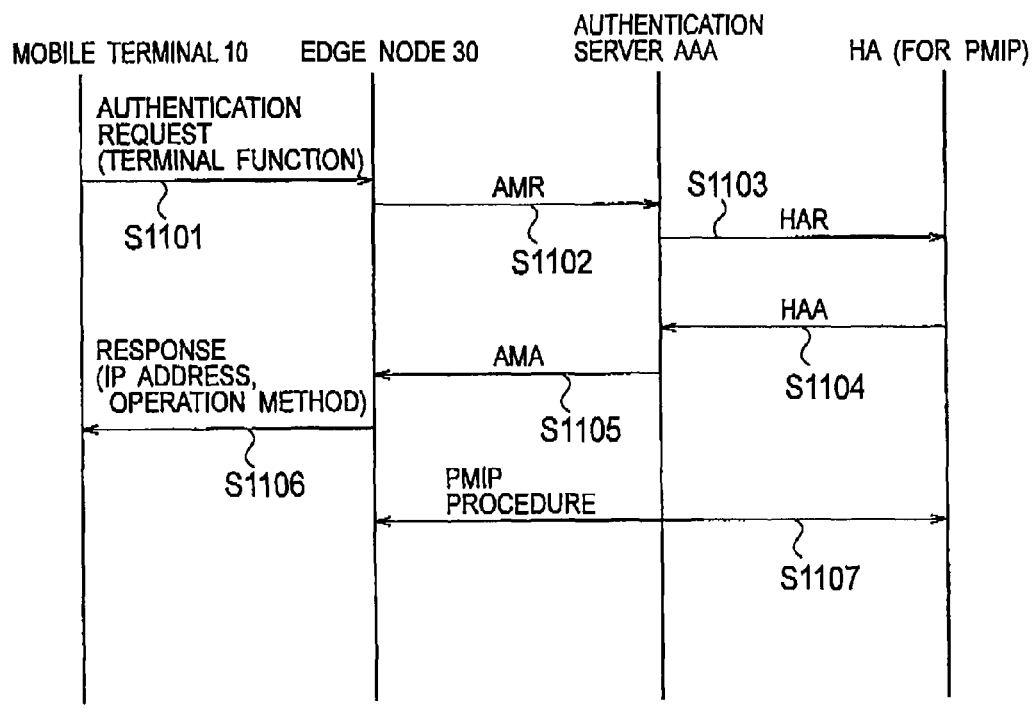
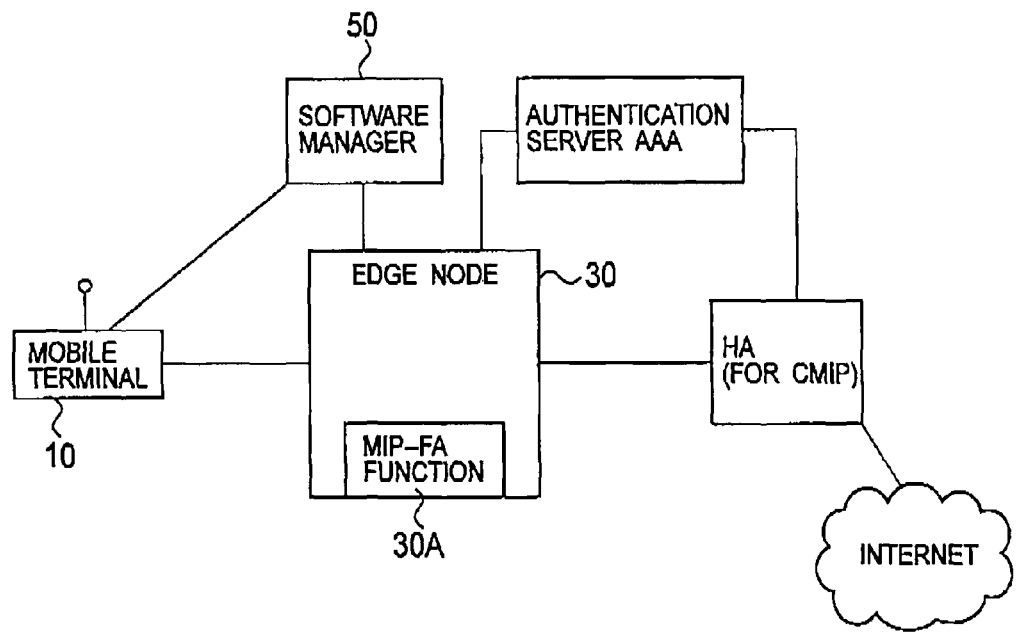

ly, at the edge node, the mobile terminal to
MOBILITY MANAGEMENT METHOD AND NETWORK DEVICE The present invention relates to a mobility management method and a network device, for performing mobility management of a mobile terminal in a mobile communication network.

BACKGROUND ART

In a conventional mobility management method, a network and a mobile terminal are configured to perform an operation for mobility management by using the same mobility management procedure.

As shown in FIG. 1, for example, when a mobile terminal 10 has an MIP (Mobile IP) function and an edge node 30 (domain #1) of a network has an MIP FA (Foreign Agent) function, the network and the mobile terminal 10 are configured to perform the mobility management operation using an MIP procedure.

In an example of FIG. 1, an HA (domain #2) is a home agent for CMIP (Client for Mobile IP) and manages a home address of the mobile terminal 10. The HA is configured to transfer an IP packet received from the Internet to an MIP FA function 30A of the edge node 30 by way of an MIP tunnel.

The MIP FA function 30A of the edge node 30 manages a foreign address of the mobile terminal 10, and is configured to transfer the packet transmitted from the HA to the mobile terminal 10.

The mobile terminal 10 has a Mobile IP client function (CMIP), and is configured to register a foreign address in the HA, the foreign address allocated by the MIP FA Function 30A of the edge node 30.

In addition, as shown in FIG. 2, the network and the mobile terminal 10 are configured to perform the mobility management operation by using a PMIP procedure, when the mobile terminal 10 does not have the MIP function, and the edge node (domain #1) 30 of the network does not have the MIP FA function and has a PMIP (Proxy Mobile IP) client function.

In an example of FIG. 2, an HA is a home agent for PMIP and manages a home address of the mobile terminal 10. The HA is configured to transfer an IP packet received from the Internet to a PMIP client function 30B of an edge node 30 that belongs to the same domain #1 as the HA.

The PMIP client function 30B of the edge node 30 is configured to register, in the HA, an IP address of the PMIP client function 30B as a foreign address of the mobile terminal 10 and to transfer the packet transmitted from the HA to the mobile terminal 10.

In addition, a mobility management method proposed in 3GPP2 or WiMAX Forum will be described with reference to FIG. 3.

As shown in FIG. 3, in step 0, a network performs authentication processing for a mobile terminal 10.

In step 1, the mobile terminal 10 notifies an edge node 30 of a terminal function which is provided to the mobile terminal 10. Herein, a Mobile IP client function, such as "MIP v4" or "MIP v6", an IP function, such as "IP v4" or "IP v6", or the like is assumed for the terminal function.

In step 2, the edge node 30 determines whether to perform a mobility management operation by using the MIP FA function 30A, or to perform the mobility management operation by using the PMIP client function 38, depending on the terminal function provided to the mobile terminal 10. In step 3, the edge node 30 notifies the mobile terminal 10 of an operation method that indicates whether to perform the mobility management operation by using the MIP client function or to perform the mobility management operation by using the IP function.

Non-Patent Document 1: 3GPP2 X.S0011-002-D Version 1.0 Section 8, February 2006

DISCLOSURE OF TEE INVENTION

However, the mobility management method proposed in 3GPP2 or WiMAX Forum has the following problem. Specifically, the method allows to determine which mobility management procedure to operate, depending on the terminal function provided to the mobile terminal 10, but does not allow to determine which mobility management procedure to operate, in accordance with circumstances in the network.

That is, although performances (such as traffic amount and time delay) or security level may vary depending on the mobility management procedure, the network side is not allowed to determine which mobility management procedure to operate.

In addition, there is another problem of cost burden increase because the network side has to be prepared for multiple mobility management procedures in order to support various terminal functions that might be provided to the mobile terminal 10.

Hence, the present invention has been made in light of the problems described above, and an object of the present invention is to provide a mobility management method and a network device, for allowing a network to take the initiative in determining which mobility management procedure to operate.

A first aspect of the present invention is summarized as a mobility management method for performing mobility management of a mobile terminal in a mobile communication network, the mobility management method including the steps of: notifying, at the mobile terminal, an edge node in the mobile communication network of a terminal function indicating that the mobile terminal has a Mobile IP client function; instructing, at the edge node, the mobile terminal to perform an operation for the mobility management by using not the Mobile IP client function but an IP function, when the edge node has a Proxy Mobile IP client function; performing, at the mobile terminal, the operation for the mobility management by using the IP function in response to the instruction from the edge node; and performing, at the edge node, the operation for the mobility management by using the Proxy Mobile IP client function.

A second aspect of the present invention is summarized as a mobility management method for performing mobility management of a mobile terminal in a mobile communication network, the mobility management method including the steps of: notifying, at the mobile terminal, an edge node in the mobile communication network of a terminal function indicating that the mobile terminal does not have a Mobile IP client function; instructing, at the edge node, the mobile terminal to perform an operation for the mobility management by using the Mobile IP client function, and notifying, at the edge node, the mobile terminal of a storage location of Mobile IP client function software for allowing implementation of the Mobile IP client function, when the edge node does not have a Proxy Mobile IP client function and has a Mobile IF Foreign Agent function; downloading, at the mobile terminal, the Mobile IP client function software from the notified storage location; performing, at the mobile terminal, the operation for the mobility management by using the Mobile IP client function which is provided to the mobile terminal through installation of the Mobile IP client function software;

and performing, at the edge node, the operation for the mobility management by using the Mobile IP Foreign Agent function.

A third aspect of the present invention is summarized as a mobility management method for performing mobility management of a mobile terminal in a mobile communication network, the mobility management method including the steps of: notifying, at the mobile terminal, an edge node in a visited network in which the mobile terminal currently resides, of a terminal function indicating whether or not the mobile terminal has a Mobile IP client function; inquiring, at the edge node, a home network of the mobile terminal about which of a Mobile IP procedure and a Proxy Mobile IP procedure is supportable by the home network; instructing, at the edge node, the mobile terminal to perform an operation for the mobility management by using the Mobile IP client function or to perform the operation for the mobility management by using an IP function, on the basis of the inquiry result from the home network; performing, at the mobile terminal, the operation for the mobility management by using either the Mobile IP client function or the IF function, in response to the instruction from the edge node; and performing, at the edge node, the operation for the mobility management by using either the Mobile IP Foreign Agent function or the Proxy Mobile IP client function, depending on the inquiry result from the home network.

A forth aspect of the present invention is summarized as a network device being provided in a mobile communication network and performing mobility management of a mobile terminal, the network device including: a terminal function acquisition unit configured to acquire a terminal function from the mobile terminal, the terminal function indicating that the mobile terminal is provided with a Mobile IP client function; an instruction unit configured to instruct the mobile terminal to perform an operation for the mobility management by using not the Mobile IP client function but an IP function, when the network device has a Proxy Mobile IP client function; and a mobility management operation unit configured to perform the operation for the mobility management by using the Proxy Mobile IP client function.

A fifth aspect of the present invention is summarized as a network device being provided in a mobile communication network and performing mobility management of a mobile terminal, the network device including: a terminal function acquisition unit configured to acquire a terminal function from the mobile terminal, the terminal function indicating that the mobile terminal does not have a Mobile IP client function; an instruction unit configured to instruct the mobile terminal to perform an operation for the mobility management by using the Mobile 12 client function, when the network device does not a Proxy Mobile IP client function and has a Mobile IP Foreign Agent function; a notification unit configured to notify the mobile station of a storage location of Mobile IP client function software for allowing implementation of the Mobile IP client function; and a mobility management operation unit configured to perform the operation for the mobility management by using the Mobile IF Foreign Agent function.

A sixth aspect of the present invention is summarized as a network device being provided in a mobile communication network and performing mobility management of a mobile terminal, the network device including: a terminal function acquisition unit configured to acquire a terminal function from the mobile terminal, the terminal function indicating whether the mobile terminal has a Mobile IP client function; an inquiry unit configured to inquire a home network of the mobile terminal about which of a Mobile IP procedure and a Proxy Mobile IP procedure is supportable by the home network; an instruction unit configured to instruct the mobile terminal to perform the operation for the mobility management by using the Mobile IP client function or to perform the operation for the mobility management by using an IP function, on the basis of the inquiry result from the home network; and a mobility management operation unit configured to perform the operation for the mobility management by using either the Mobile IP Foreign Agent function or the Proxy Mobile IP client function, depending on the inquiry result from the home network.

As described above, the present invention can provide a mobility management method and a network device for allowing a network to take the initiative in determining a mobility management procedure to operate.

BRIEF DESCRIPTION OF THE DRAWINGS

FIG. 6 is a functional block diagram of an edge node according to a first embodiment of the present invention.

FIG. 7 is a sequence diagram showing operations of the mobile communication system according to the first embodiment of the present invention.

FIG. 8 is a sequence diagram showing operations of the mobile communication system according to the first embodiment of the present invention.

FIG. 9 is a diagram of an overall configuration of a mobile communication system according to a second embodiment of the present invention.

BEST MODE CARRYING OUT THE INVENTION

Configuration of the Mobility Management System According to the First Embodiment of the Present Invention A configuration of a mobility management system according to a first embodiment of the present invention will be described with reference to FIGS. 4 to 6.

Figure 1:
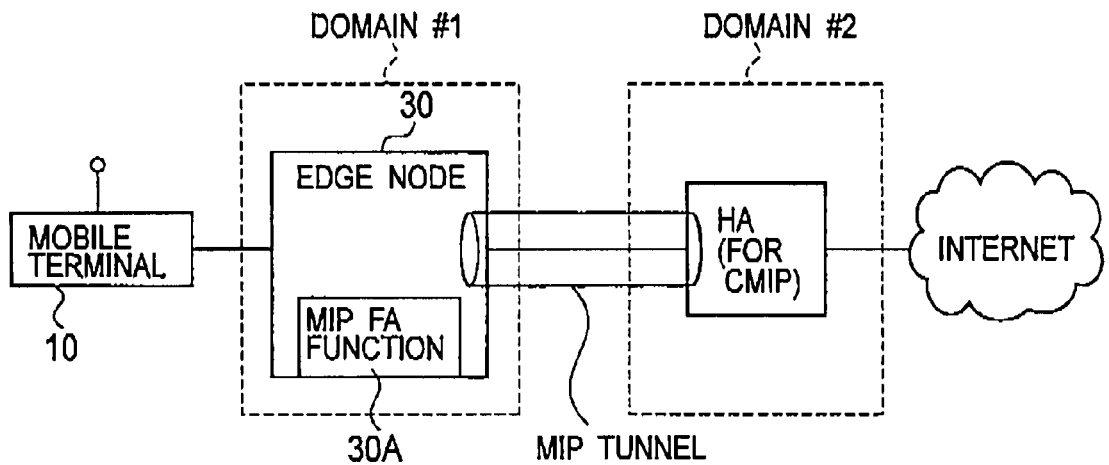
FIG. 1 is a diagram illustrating mobility management in a conventional mobile communication system.
Figure 2:
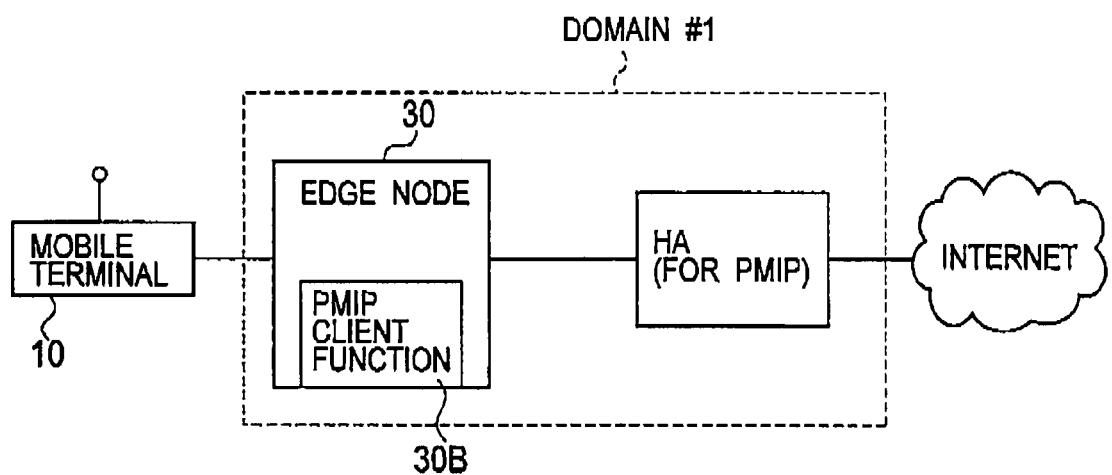
FIG. 2 is a diagram illustrating mobility management in a conventional mobile communication system.
Figure 3:
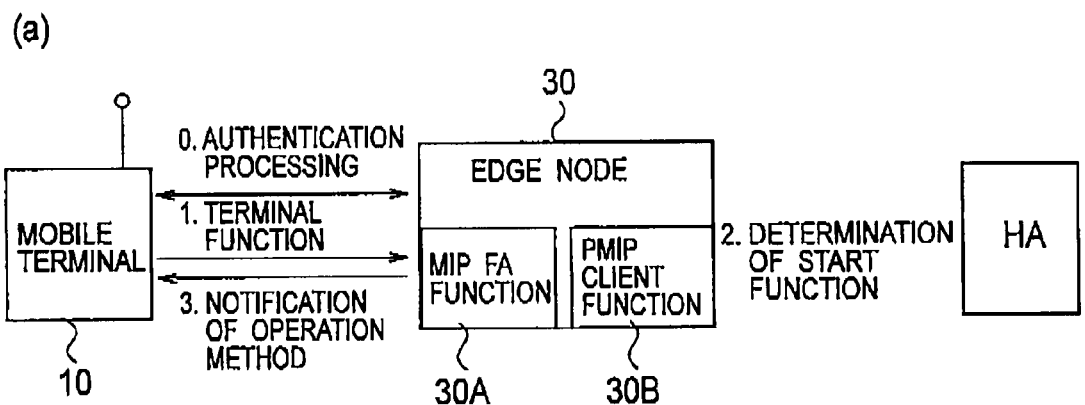
FIG. 3 is a diagram illustrating mobility management proposed in 3GPP2 and WiMAX Forum.
Figure 4:
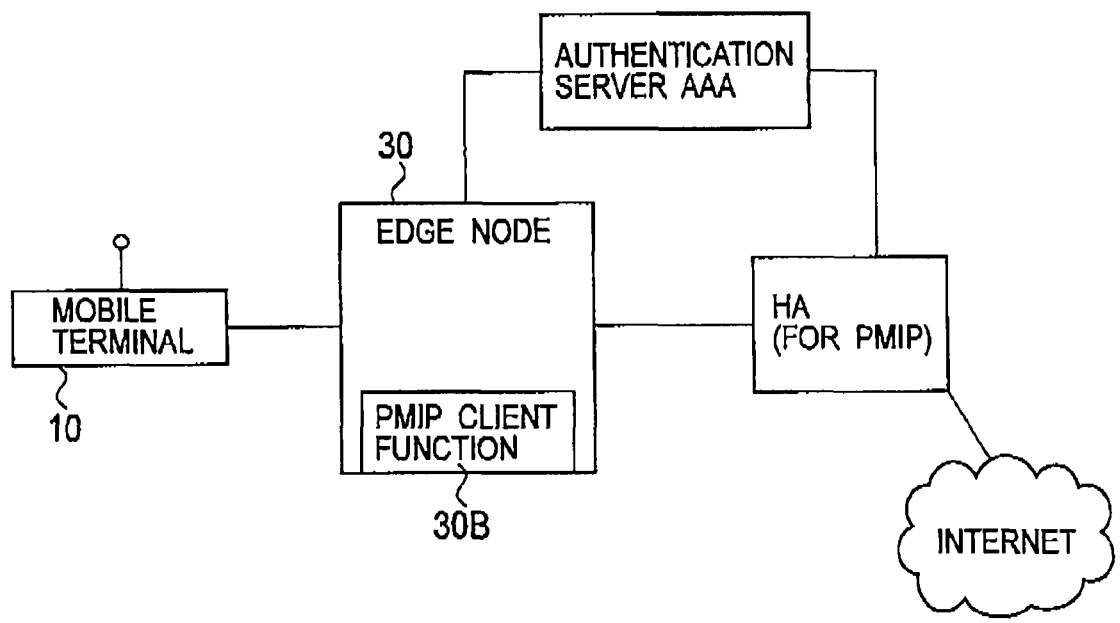
FIG. 4 is a diagram of an overall configuration of a mobile communication system according to a first embodiment of the present invention.

As shown in FIG. 4, the mobility management system according to the embodiment is configured to perform mobility management of a mobile terminal 10 in a mobile communication network, and includes an HA (for PMIP), an authentication server AA, and an edge node 30, as network devices.

Figure 5:
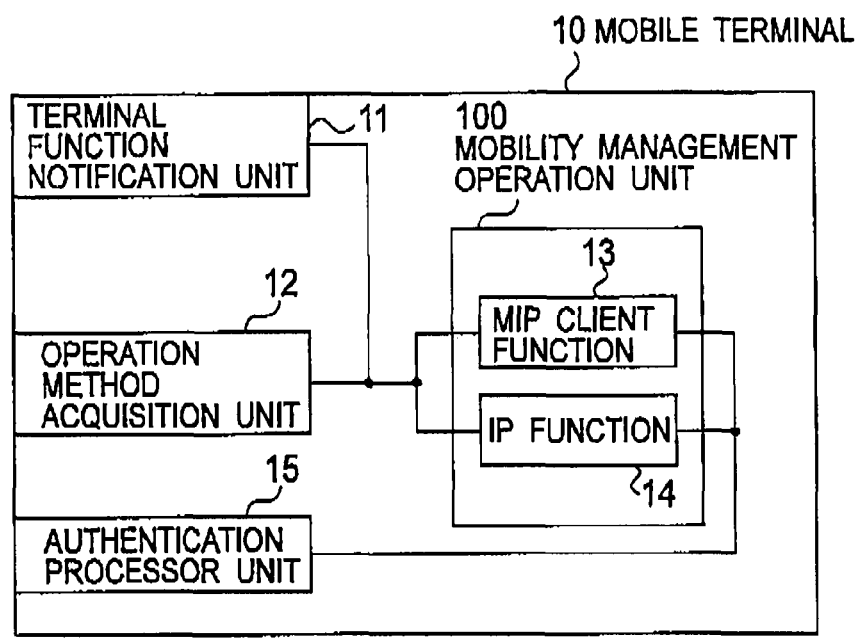
FIG. 5 is a functional block diagram of a mobile terminal according to the first embodiment of the present invention.

As shown in FIG. 5, the mobile terminal 10 includes a terminal function notification unit 11, an operation method acquisition unit 12, an authentication processor unit 15, and a mobility management operation unit that includes an MIP client function 13 and an IP function 14.

The terminal function notification unit 11 is configured to notify the edge node 30 of a terminal function provided to the mobile terminal 10.

Herein, a Mobile IP client function, such as "MIP v4" or "MIP v6", an IP function, such as "IP v4" or "IP v6", or the like is assumed for the terminal function.

In addition, the terminal function notification unit 11 may also be configured to notify the edge node 30 of a terminal function indicating whether the mobile terminal 10 has the MIP client function or not.

The operation method acquisition unit 12 is configured to acquire an operation method indicating a mobility management procedure to operate, from the edge node 30.

Herein, an MIP procedure, a PMIP procedure, or the like is assumed as a mobility management procedure to operate.

By transmitting an authentication request to the authentication server AAA, the authentication processor unit 15 requests the authentication server AAA to perform authentication processing for the mobile terminal 10.

The mobility management operation unit 100 is configured to perform a mobility management operation corresponding to an operation method instructed by the edge node 30.

Specifically, the mobility management operation unit 100 is configured to perform the mobility management operation by using the MIP client function 13 when the mobile procedure to operate indicated by the edge node 30 is an MIP procedure (i.e., when instructed to perform the mobility management operation by using the MIP client function 13).

In addition, the mobility management operation unit 100 is configured to perform the mobility management operation by using the IP function 14 when the mobile procedure to operate indicated by the edge node 30 is a PMIP procedure (i.e., when instructed to perform the mobility management operation by using the IP function 14).

As shown in FIG. 6, the edge node 30 includes a terminal function acquisition unit 31, an operation method notification unit 32, an IP address allocation unit 33, and a mobility management operation unit 34 that includes a PMIP client function 30.

The terminal function acquisition unit 31 is configured to acquire a terminal function provided to the mobile terminal 10, from the mobile terminal 10.

Specifically, the terminal function acquisition unit 31 may be configured to acquire the terminal function in a link setting procedure, or may be configured to acquire the terminal function in an authentication processing procedure.

The operation method notification unit 32 is configured to notify the mobile terminal 10 of an operation method indicating a mobility management procedure to operate.

In the embodiment, the edge node 30 is provided with the PMIP client function 30B. Accordingly, even if the mobile terminal 10 is provided with the MIP client function 13, the operation method notification unit 32 instructs the mobile terminal 10 to perform the mobility management operation by using not the MIP client function 13 but the IP function ("IP v4" or "IP v6") 14

The mobility management operation unit 34 is configured to perform the mobility management operation by using the PMIP client function 30B.

The authentication server AAA is configured to perform authentication processing for the mobile terminal 10 in response to an authentication request transmitted from the mobile terminal 10.

The HA (for PMIP) is a home agent for PMIP and manages a home address of the mobile terminal 10. The HA is configured to transfer an IP packet received from Internet 1 to the PMIP client function 30B of the edge node 30 belonging to the same domain as the HA (for PMIP).

Operations of the Mobility Management System According to the First Embodiment of the Invention The operations of the mobility management system according to the first embodiment of the present invention will be described with reference to FIGS. 7 and 8.

First, a first operation of the mobility management system according to the embodiment will be described with reference to FIG. 7.

As shown in FIG. 7, in a link setting procedure with the edge node 30, in step S1001, the mobile terminal 10 notifies the edge node 30 of a terminal function provided to the mobile terminal 10. In step S1002, the edge node 30 notifies the mobile terminal 10 of an operation method instructing the mobile terminal 10 to perform a mobility management operation by using not the MIP client function 13 but the IP function 14.

In step S1003, based on the notified operation method, the mobile terminal 10 performs the mobility management operation by using the IP function 14.

In step S1004, the mobile terminal 10 transmits an authentication request, such as EAP-AKA, to the edge node 30.

In step S1005, the edge node 30 transmits "AMR (AAA Mobile Node Request)" specified in RFC 4004 to the authentication server AAA to request the authentication server AAA to perform authentication processing for the mobile terminal 10.

In step S1006, the authentication server AAA transmits "HAR (Home Agent MIP Request)" specified in RFC 4004 to the HA (for PMIP) to acquire registered information on the mobile terminal 10.

In step S1007, the HA (for PMIP) transmits "HAA (Home Agent MIP Answer)" specified in RF4004 to the authentication server AAA in order to notify of the registered information on the mobile terminal 10.

In step S1008, using the registered information on the mobile terminal 10 notified of by the HP (for PMIP), the authentication server AAA performs the authentication processing for the mobile terminal 10, and transmits "AMA (AA Mobile Node Answer)" specified in RFC 4004 to the edge node 30 in order to notify of the result of the authentication processing for the mobile terminal 10.

In step S1009, the edge node 30 not only notifies the mobile terminal 10 of the result of the authentication processing for the mobile terminal 10 but also transmits an IP address allocated to the mobile terminal 10.

In step S1010, in a PMIP procedure, the edge node 30 allocates one of IP addresses of the edge node 30 to the mobile terminal 10 as a foreign address (CoA), and registers the foreign address of the mobile terminal 10 in the HA (for PMIP).

Secondly, a second operation of the mobility management system according to the embodiment will be described with reference to FIG. 8.

As shown in FIG. 8, in step S1101, the mobile terminal 10 transmits an authentication request (such as EAP-AKA) including a terminal function provided to the mobile terminal 10, to the edge node 30.

In step S1102, the edge node 30 transmits "AMR" to the authentication server AAA. In step S1103, the authentication server AAA transmits "HAR" to the HA (for PMIP).

In step S1104, the HA (for PMIP) transmits "HAA" to the authentication server AAA. In step S1105, the authentication server AAA performs authentication processing for the mobile terminal 10 by using registered information on the mobile terminal 10 notified of by the HA (for PMIP) and transmits "AMA" to the edge node 30.

In step S1106, the edge node 30 notifies the mobile terminal 10 of the result of the authentication processing for the mobile terminal 10, and an IP address allocated to the mobile terminal 10.

In addition, in step S1106, the edge node 30 notifies the mobile terminal 10 of an operation method instructing the mobile terminal 10 to perform a mobility management operation by using not the MIP client function 13 but the IP function 14.

In step S1107, in the PMIP procedure, the edge node 30 allocates one of the IP addresses of the edge node 30 to the mobile terminal 10 as a foreign address (CoA), and registers the foreign address of the mobile terminal 10 in the HA (for PMIP).

Advantageous Effects of the Mobility Management System According to the First Embodiment of the Present Invention With the mobility management system according to the first embodiment of the present invention, the mobile terminal 10 is configured as follows when the edge node 30 has the PMIP client function 30B. Specifically, the mobile terminal 10 uses not the MIP procedure but the PMIP procedure even when including the MIP client function 13. Hence, use of the MIP procedure, which tends to increase traffic amount and causes a greater time delay, can be avoided.

Configuration of the Mobility Management System According to the Second Embodiment of the Present Invention A mobility management system according to a second embodiment of the present invention will be described with reference to FIGS. 9 to 11, focusing on differences from the mobility management system according to the first embodiment described above.

As shown in FIG. 9, the mobility management system according to the embodiment includes an HA (for PMIP), an authentication server AAA, an edge node 30, and a software manager 50 as network devices.

Figure 10:
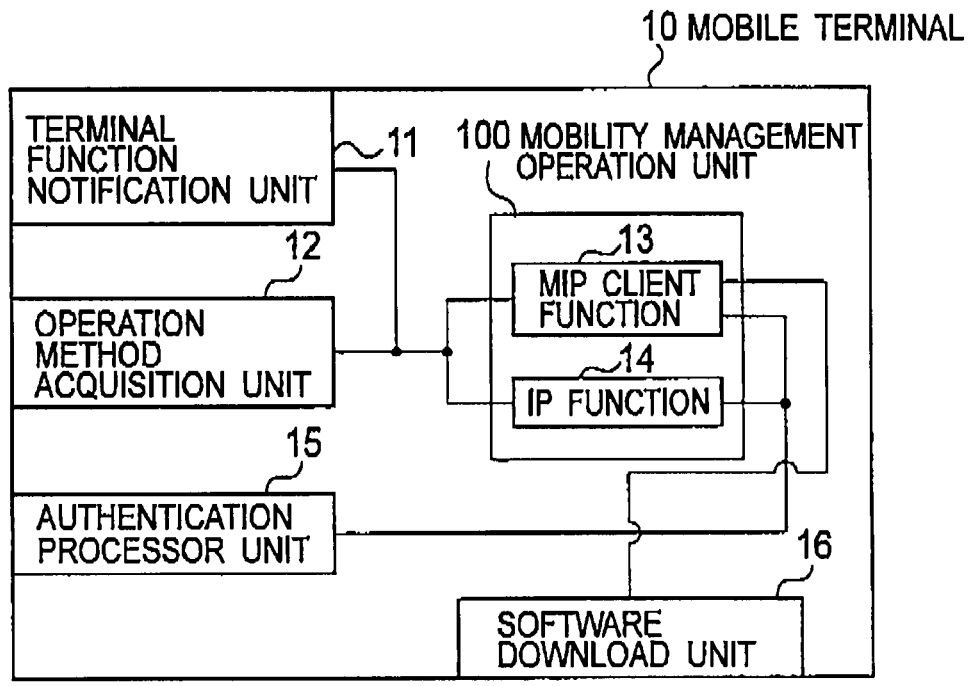
FIG. 10 is a functional block diagram of a mobile terminal according to the second embodiment of the present invention.

As shown in FIG. 10, a mobile terminal 10 according to the embodiment includes a software download unit 16, in addition to the configuration of the mobile terminal 10 according to the first embodiment described above.

The software download unit 16 is configured to download MIP client function software from a storage location notified of by the edge node 30. The MIP client function software allows implementation of the MIP client function.

Figure 11:
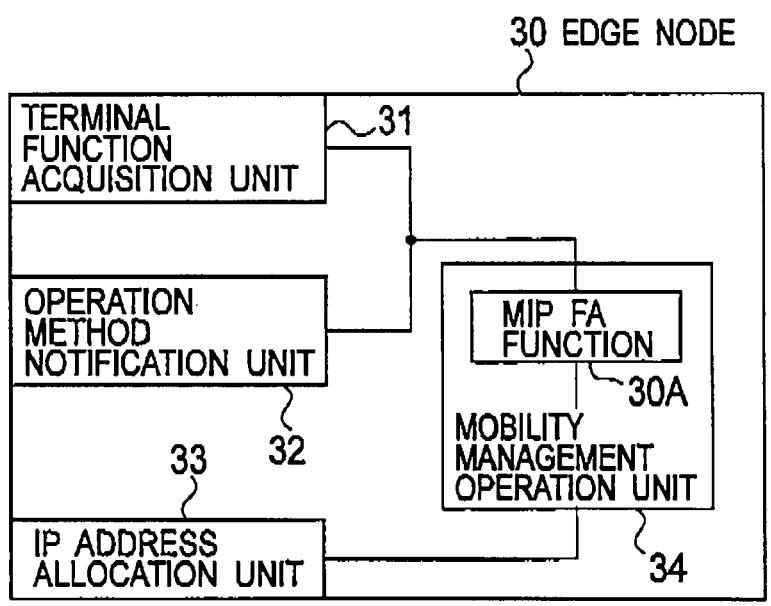
FIG. 11 is a functional block diagram of an edge node according to the second embodiment of the present invention.

In addition, as shown in FIG. 11, the edge node 30 according to the embodiment does not have the PMIP client function 30B, and is configured having an MIP FA function 30A.

In addition, in the embodiment, the operation method notification unit 32 or the IP address allocation unit 33 is configured to notify of a storage location of the MIP client function software.

In addition, the operation method notification unit 32 or the IP address allocation unit 33 may be configured to transmit a token necessary for downloading the MIP client function software, together with the storage location mentioned above.

In addition, the HA (for CMIP) is a home agent for a CMIP (client for MIP) and manages a home address of the mobile terminal 10. The HA is configured to transmit an IP packet received from the Internet to the MIP FA function 30A of the edge node 30 by way of an MIP tunnel.

The software manager 50 is configured to store the MIP client function software in the above mentioned storage location.

Operation of Mobility Management System According to Second Embodiment of Present Invention The operations of the mobility management system according to the second embodiment of the present invention will be described with reference to FIGS. 12 and 13.

First, a first operation of the mobility management system according to the embodiment will be described with reference to FIG. 12.

Figure 12:
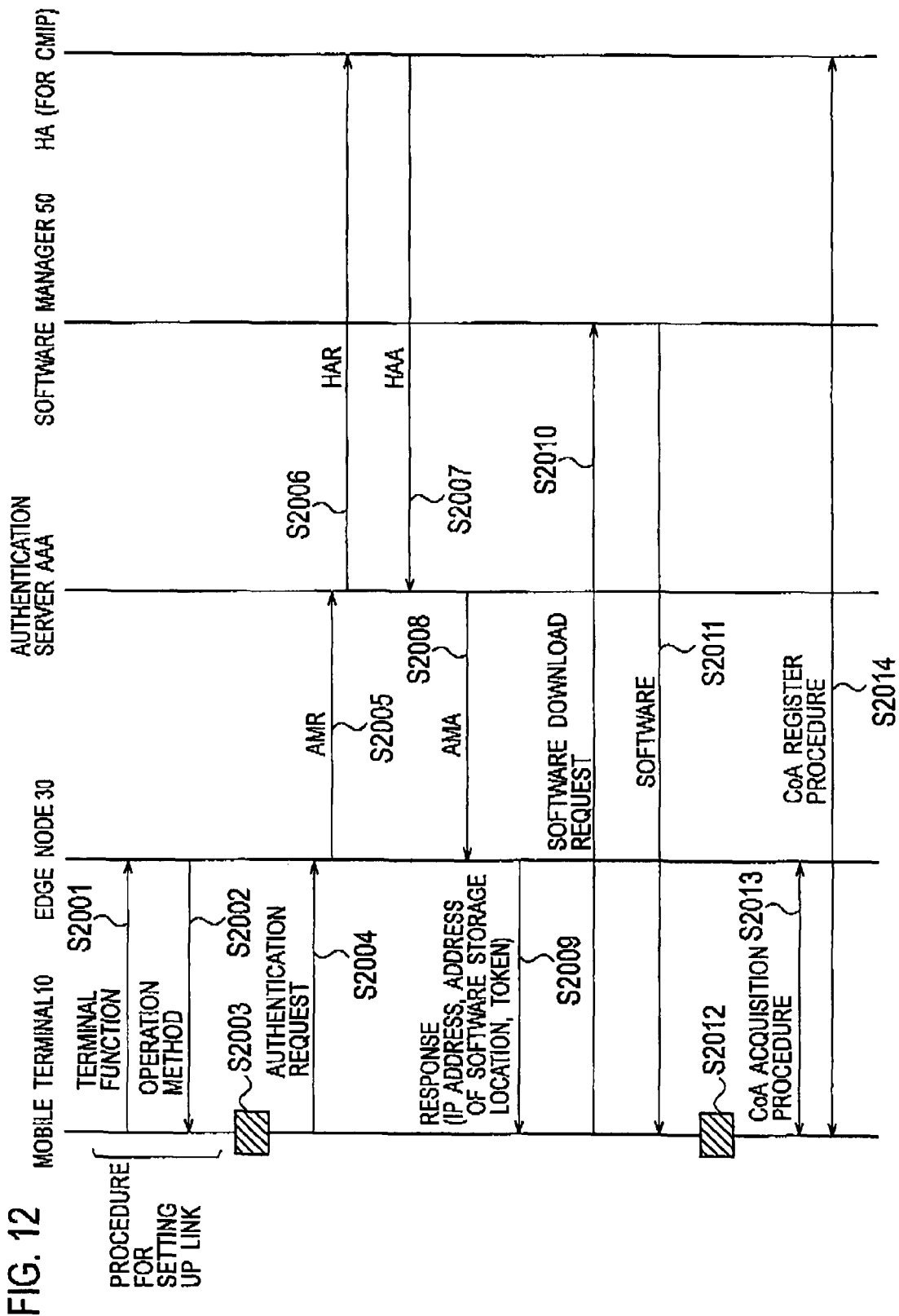
FIG. 12 is a sequence diagram showing operations of a mobile communication system according to the second embodiment of the present invention.

As shown in FIG. 12, in a procedure for setting link with the edge node 30, in step S2001, the mobile terminal 10 notifies the edge node 30 of a terminal function (only the IP function 14) provided to the mobile terminal 10. In step S2002, the edge node 30 notifies the mobile terminal 10 of an operation method instructing the mobile terminal 10 to perform a mobility management operation by using the MIP client function 13.

The operations of steps S2003 to S2008 are the same as the operations of steps S1003 to step S1008 shown in FIG. 7.

In step S2009, the edge node 30 notifies the mobile terminal 10 of the result of the authentication processing for the mobile terminal 10, and an IP address allocated to the mobile terminal 10.

In addition, in step S2009, the edge node 30 notifies the mobile terminal 10 of a storage location of the MIP client function software and a token as well.

In step S2010, the mobile terminal 10 refers to the storage location notified of by the edge node 30, and transmits a software download request for downloading the MIP client function software, to the software manager 50. In step S2011, the software manager 50 transmits the MIP client function software to the mobile terminal 10.

In step S2012, the mobile terminal 10 starts the MIP client function 13 by installing the downloaded MIP client function software.

In step S2013, the MIP client function 13 of the mobile terminal 10 acquires a foreign address (CoA) of the mobile terminal 10 allocated by the MIP FA function 30A of the edge node 30.

In step S2014, the MIP client function 13 of the mobile terminal 10 registers the foreign address of the mobile terminal 10 in the HA (for CMIP).

Secondly, a second operation of the mobility management system according to the embodiment will be described with reference to FIG. 13.

Figure 13:
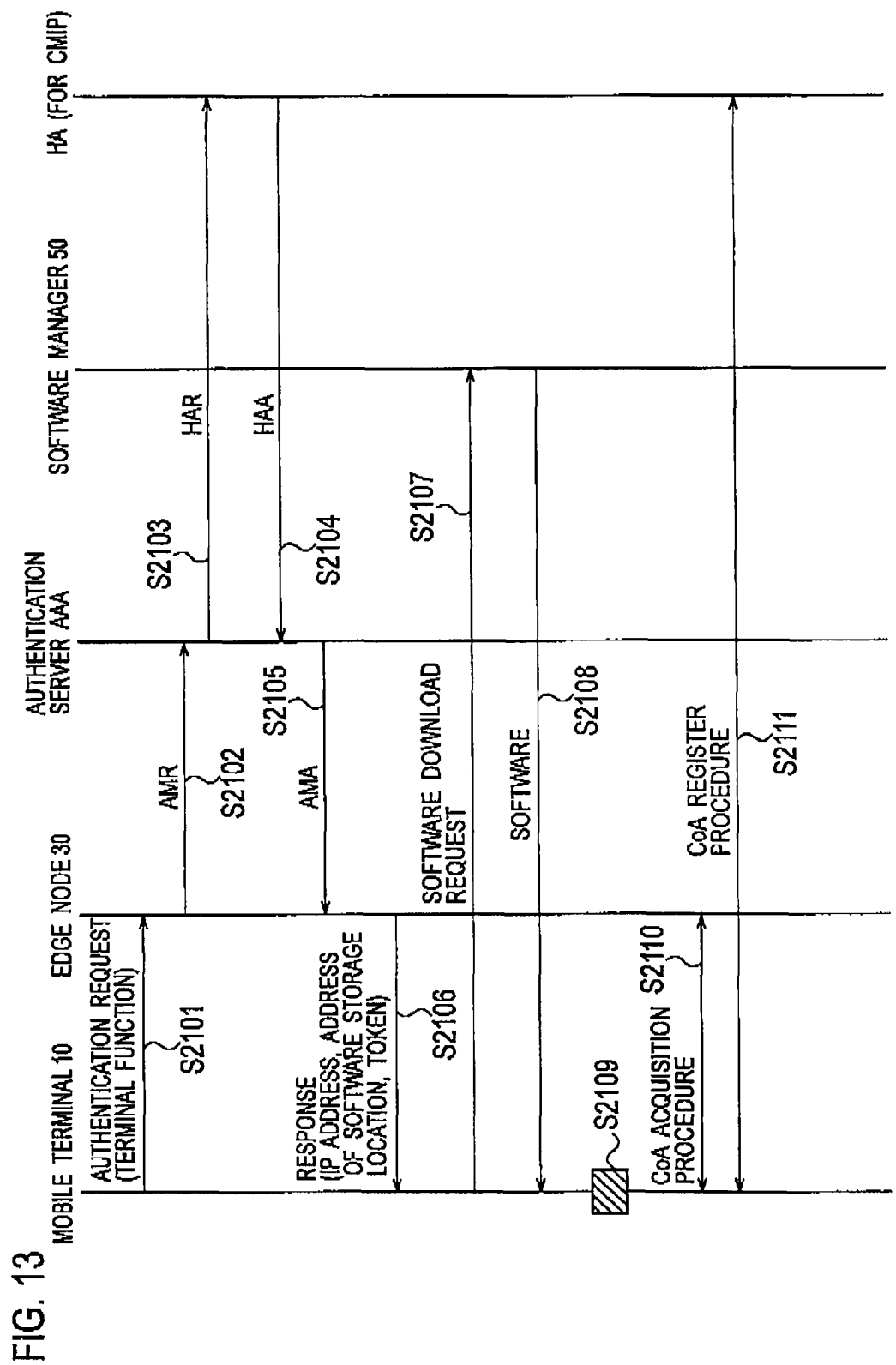
FIG. 13 is a sequence diagram showing operations of the mobile communication system of a second embodiment of the present invention.

As shown in FIG. 13, in step S2101, the mobile terminal 10 transmits an authentication request (such as EAP-AKA) including a terminal function (only the IP function 14) provided to the mobile terminal 10, to the edge node 30.

In step S2102, the edge node 30 transmits "AMR" to the authentication server AAA, and in step S2103, the authentication server AAA transmits "HAR" to the HA (for CMIP).

In step S2104, the HA (for CMIP) transmits "HAA" to the authentication server AAA. In step S2105, the authentication server AAA performs the authentication processing for the mobile terminal 10 by using registered information on the mobile terminal 10 notified of by the HA (for CMIP), and transmits "AMA" to the edge node 30.

In step S2106, the edge node 30 notifies the mobile terminal 10 of the result of the authentication processing for the mobile terminal 10, and the IP address allocated to the mobile terminal 10.

In step S2106, the edge node 30 notifies the mobile terminal 10 of an operation method instructing the mobile terminal 10 to perform a mobility management operation by using the MIP client function 13.

In addition, in step S2106, the edge node 30 notifies the mobile terminal 10 of the storage location of the MIP client function software and the token, as well.

The operations of the following steps S2107 to S2111 are the same as the operations of step S2010 to S2014 shown in FIG. 12.

Advantageous Effects of the Mobility Management System According to the Second Embodiment of the Present Invention With the mobility management system according to the second embodiment of the present invention, even when the edge node 30 does not have the PMIP client function 30B and has only the MIP FA function 30A, and when the mobile terminal 10 does not have the MIP client function 13, the edge node 30 can perform mobility management of the mobile terminal 10 without having had to prepare multiple mobility management procedures, by causing the mobile terminal 10 to download the MIP client function software.

Figure 14:
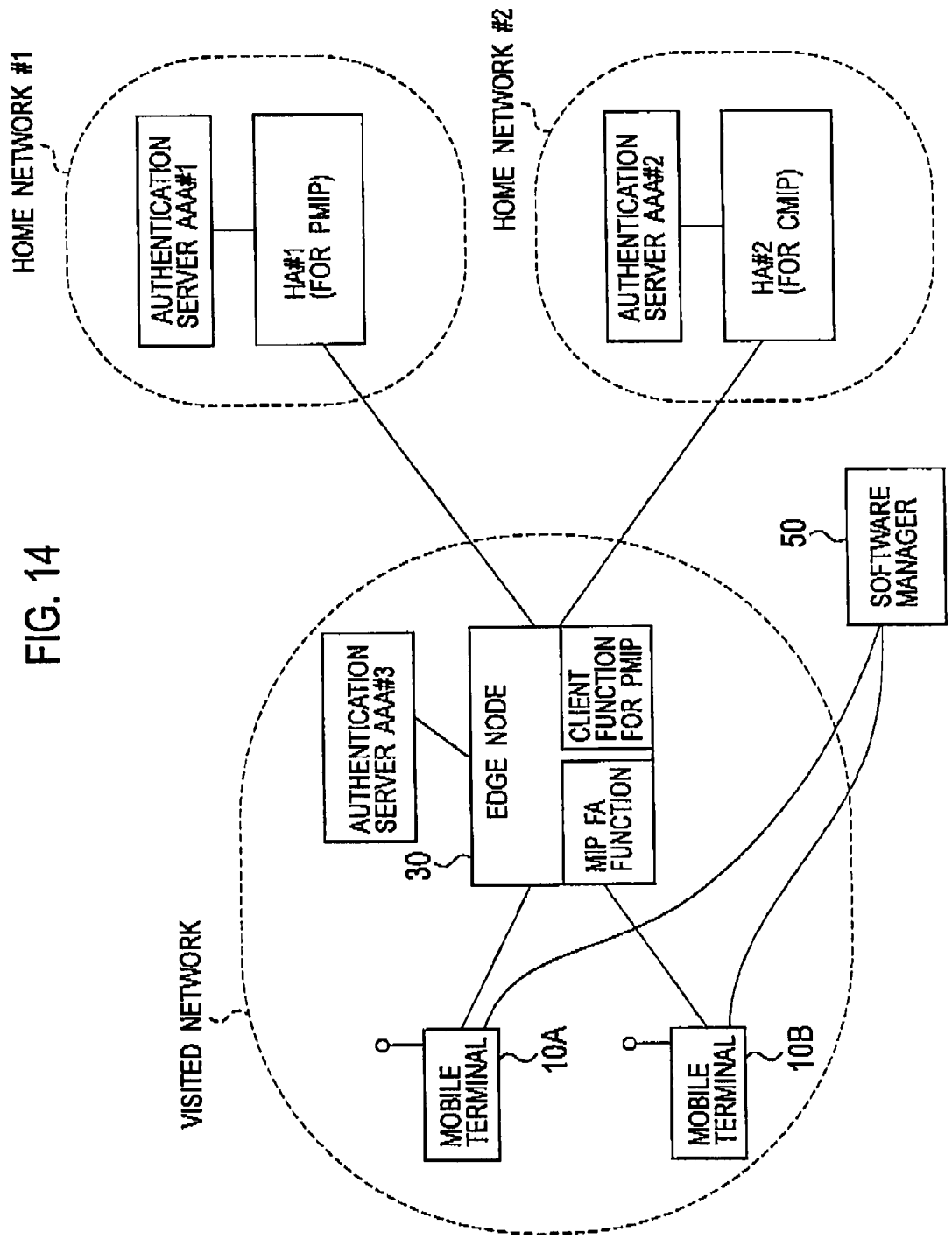
FIG. 14 is a diagram of an overall configuration of a mobile communication system according to a third embodiment of the present invention.

Configuration of the Mobility Management System According to the Third Embodiment of the Present Invention A mobility management system according to a third embodiment of the present invention will be described with reference to FIGS. 14 and 15, focusing on differences from the mobility management system according to the first embodiment described above.

The mobility management system according to the embodiment includes a home network #1, a home network #2, and a visited network in which mobile terminals 10A and 10B currently reside by roaming.

The home network #1 is configured to be able to support a PMIP procedure. Thus, an HA #1 for PMIP is provided in the home network #1.

In addition, the home network #2 is configured to be able to support an MIP procedure. Thus, an HA#2 for CMIP is provided in the home network #2.

In addition, an edge node 30 provided in the visited network is connected to the home networks #1 and #2, and the home network #1 and the visited network belong to the same domain, while only the home network #2 belongs to a different domain.

Figure 15:
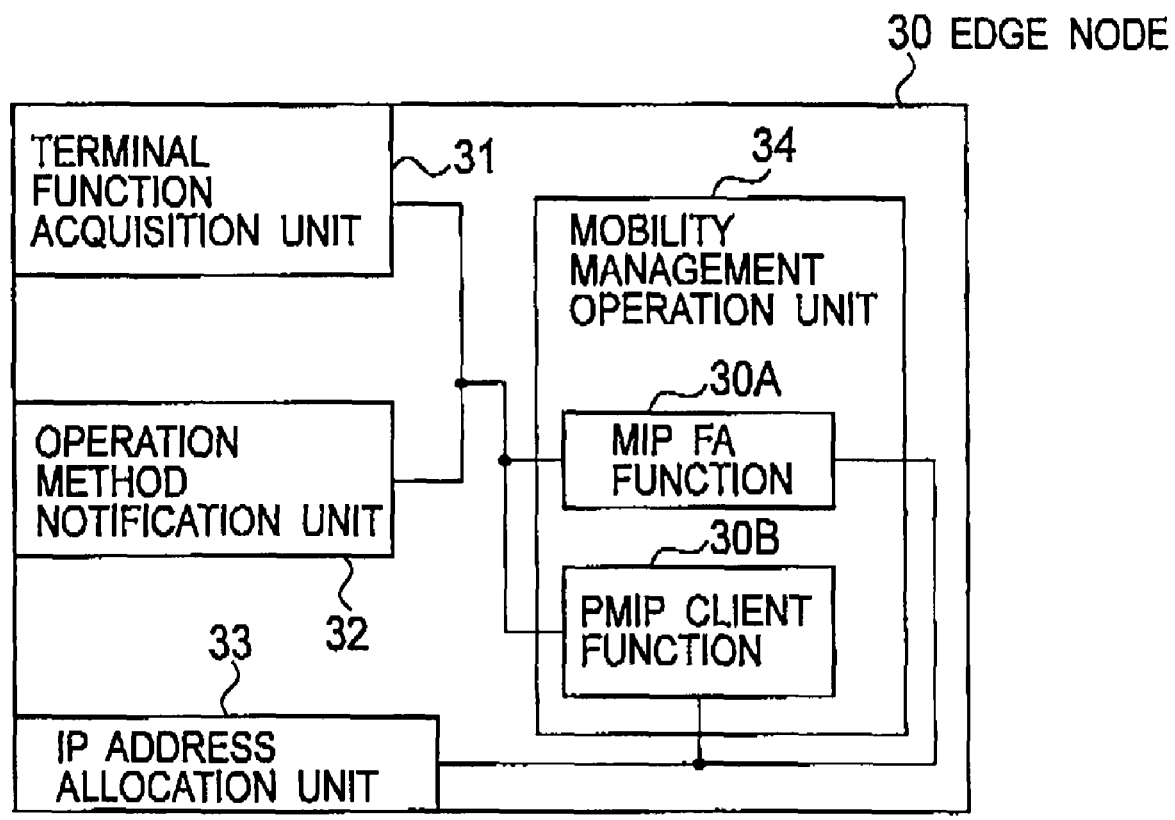
FIG. 15 is a functional block diagram of an edge node according to the third embodiment of the present invention.

As shown in FIG. 15, the edge node 30 has both the MIP client function 30A and the PMIP client function 30B.

In addition, the mobility management operation unit 34 is configured to inquire the home networks #1, #2 about which of the MIP procedure and the PMIP procedure they can support.

In addition, the mobility management operation unit 34 is configured to perform a mobility management operation for the mobile terminals 10A, 10B by using either the MIP FA function 30A or the PMIP client function 30B, depending on the inquiry result from the home networks #1, #2.

The operation method notification unit 32 is configured to instruct the mobile terminals 10A, 10B to perform the mobility control operation by using the MIP client function 13 or to perform the mobility management operation by using the IP function 14, on the basis of the inquiry result from the home networks #1, #2 described above.

Operations of the Mobility Management System According to the Third Embodiment of the Present Invention The operations of the mobility management system according to the third embodiment of the present invention will be described with reference to FIGS. 16 to 23.

First, a first operation of the mobility management system according to the embodiment will be described with reference to FIG. 16. In an example of FIG. 16, the mobile terminal 10B has the MIP client function 13, and a home address #1 of the mobile terminal 10B does not support an MIP procedure and supports a PMIP procedure.

Figure 16:
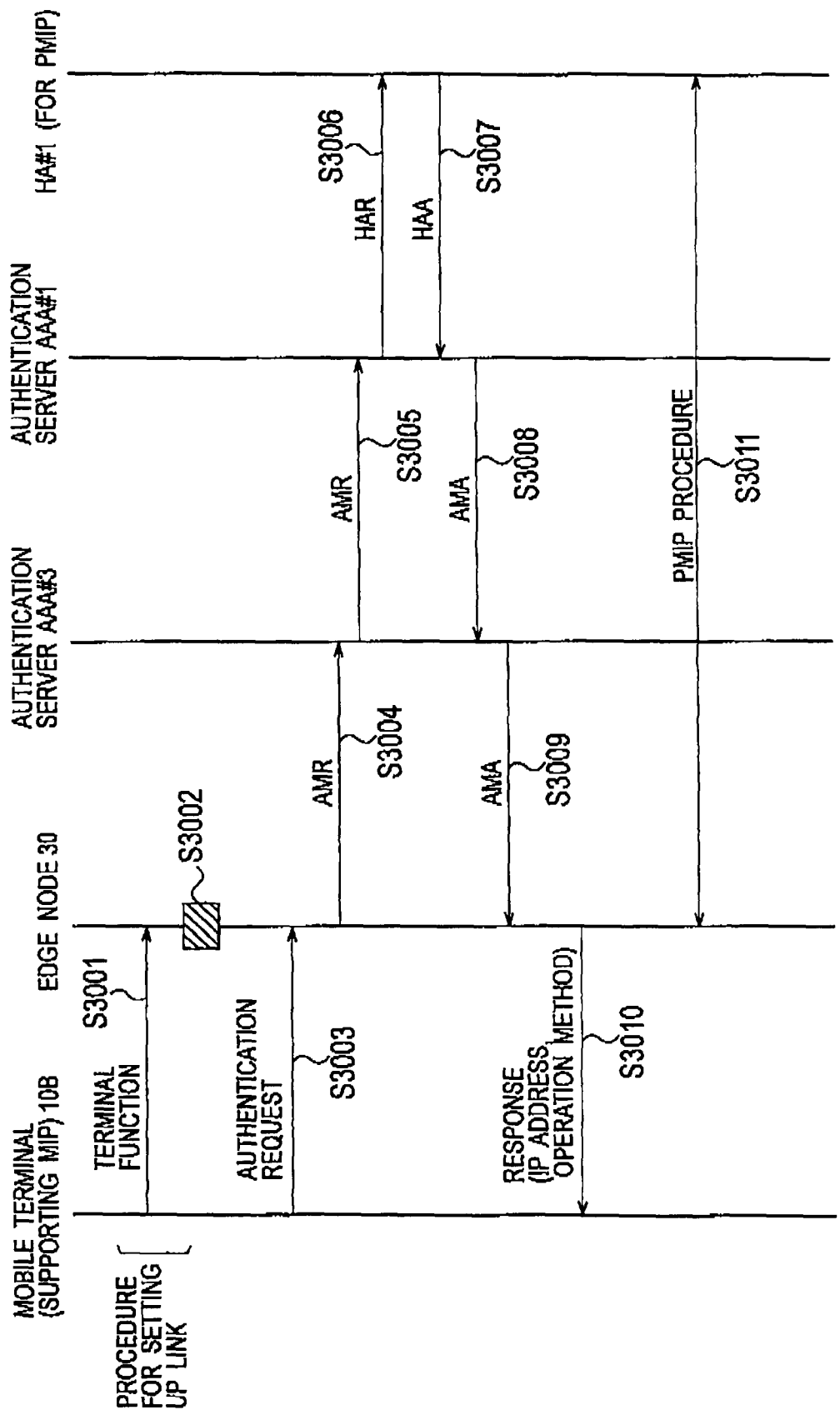
FIG. 16 is a sequence diagram showing operations of the mobile communication system according to the third embodiment of the present invention.

As shown in FIG. 16, in step S3001 in a procedure for setting link with the edge node 30, the mobile terminal B notifies the edge node 30 of terminal functions (the MIP client function 13 and the IP function 14) provided to the mobile terminal 10B.

In step S3002, the edge node 30 stores therein the terminal functions (the MIP client function 13 and the IP function 14) provided to the mobile terminal 10.

In step S3003, the mobile terminal 10B transmits an authentication request, such as EAP-AKA, to the edge node 30.

In step S3004, in order to request authentication processing for the mobile terminal 10B and to inquire a home network #1 about which of the MIP procedure and the PMIP procedure the home network #1 can support, the edge node 30 transmits "AMR" to an authentication server AAA#3 provided in the visited network. In step S3005, the authentication server AAA#3 transmits "AMR" to an authentication server AAA#1 provided in the home network #1.

In step S3006, the authentication server AAA#1 transmits "HAR" to the HA#1 (for PMIP) to acquire registered information on the mobile terminal 10B, and in step S3007, the HA#1 (for PMIP) transmits "HAA" to the authentication server AAA#1 to notify of the registered information on the mobile terminal 10B.

In step S3008, the authentication server AAA#1 transmits "AMA" to the authentication server AAA#3 to notify the result of the authentication performed by using the registered information on the mobile terminal 10B notified of by the HA#1 (for PMIP), and to notify ability of the home network #1 (inquiry result indicating that the home network #1 can support the PMIP procedure). In step S3009, the authentication server AAA#3 transmits "AMA" to the edge node 30.

In step S3010, the edge node 30 notifies the mobile terminal 10B of the result of the authentication processing for the mobile terminal 10B, and an IP address allocated to the mobile terminal 10B.

In addition, in step S3010, the edge node 30 notifies the mobile terminal 10B of an operation method instructing the mobile terminal 10B to perform the mobility management operation by using not the MIP client function 13 but the IP function 14.

In step S3011, in the PMIP procedure, the edge node 30 allocates one of IP addresses of the edge node 30 to the mobile terminal 10B as a foreign address (CoA), and registers the foreign address of the mobile terminal 10B in the HA (for PMIP).

Secondly, a second operation of the mobility management system according to the embodiment will be described with reference to FIG. 17. In an example of FIG. 17, the mobile terminal 10A does not have the MIP client function 13 and has only the IP function 14, the home address #1 of the mobile terminal 10A does not support the MIP procedure and supports the PMIP procedure.

Figure 17:
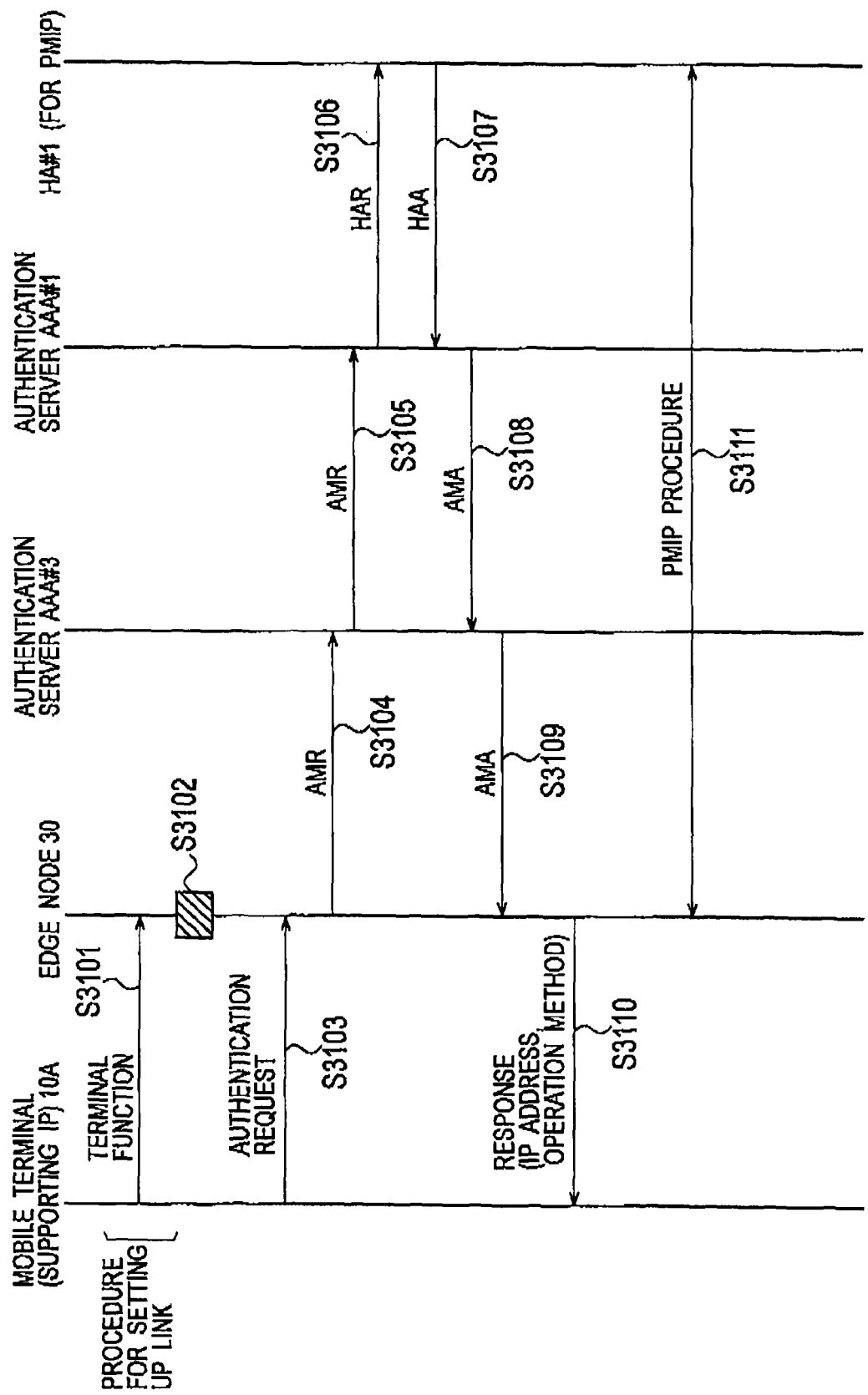
FIG. 17 is a sequence diagram showing operations of the mobile communication system according to the third embodiment of the present invention.

As shown in FIG. 17, in step S3101 in a procedure for setting link with the edge node 30, the mobile terminal 10A notifies the edge node 30 of the terminal function (only the IP function 14) provided to the mobile terminal 10A.

In step S3102, the edge node 30 stores therein the terminal function (only the IP function 14) provided to the mobile terminal 10A.

The operations of the following steps S3103 to S3111 are the same as the operations of the steps S3003 to S3011 shown in FIG. 16.

Thirdly, a third operation of the mobility management system according to the embodiment will be described with reference to FIG. 18. In an example of FIG. 18, the mobile terminal 10B has the MIP client function 13, and the home address #1 of the mobile terminal 10B does not support the MIP procedure and supports the PMIP procedure.

Figure 18:
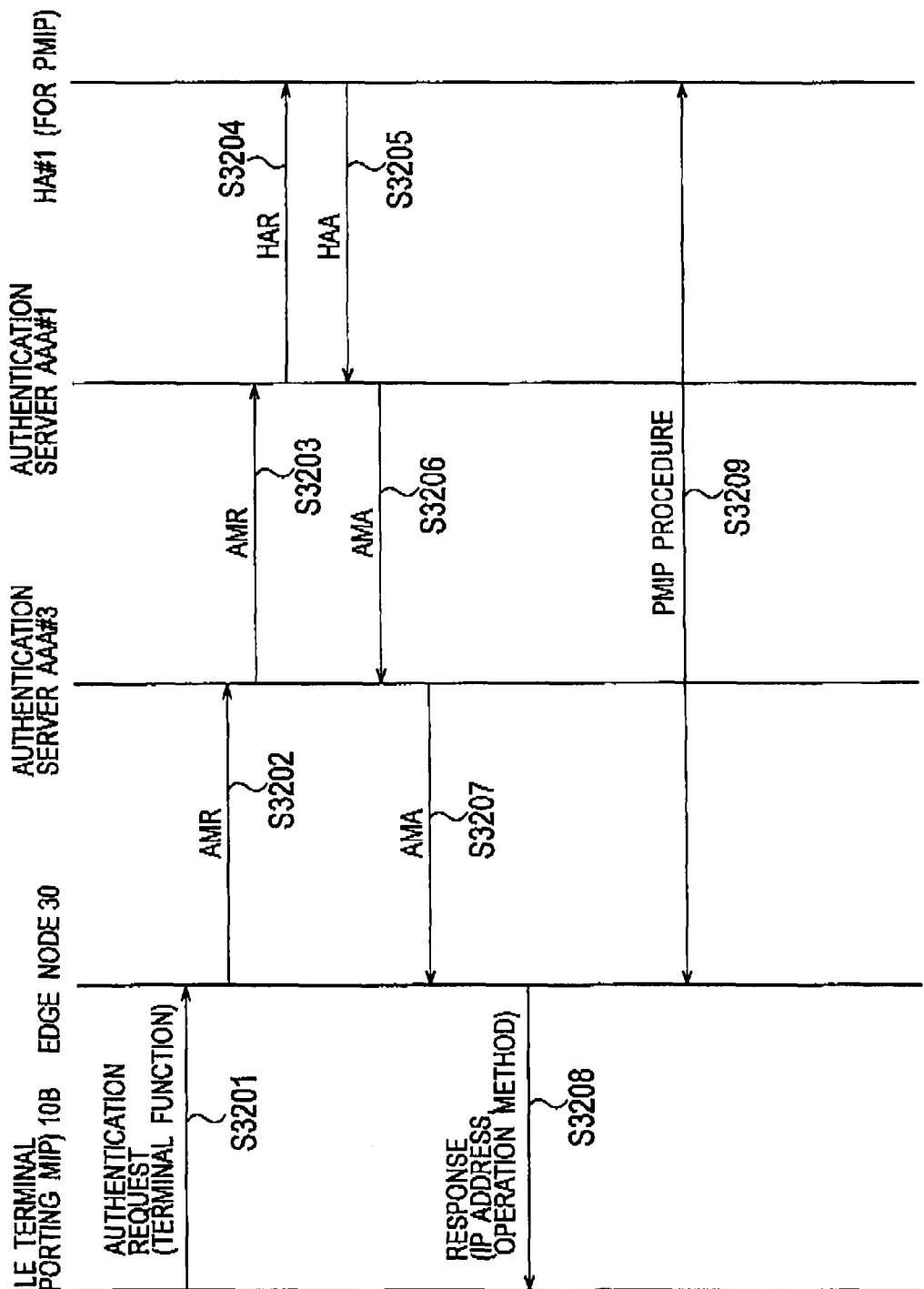
FIG. 18 is a sequence diagram showing operations of the mobile communication system according to the third embodiment of the present invention.

As shown in FIG. 18, in step S3201, the mobile terminal 10B transmits an authentication request (such as EAP-AKA) including terminal functions (the MIP client function 13 and the IP function 14) the mobile terminal 10B, to the edge node 30.

The operations of the following steps S3202 to S3209 are the same as the operations of the steps S3004 to S3011 shown in FIG. 16.

Fourthly, a fourth operation of the mobility management system according to the embodiment will be described with reference to FIG. 19. In an example of FIG. 19, the mobile terminal 10A does not have the MIP client function 13 and has only the IP function, and the home address #1 of the mobile terminal 10A does not support the MIP procedure and supports the PMIP procedure.

Figure 19:
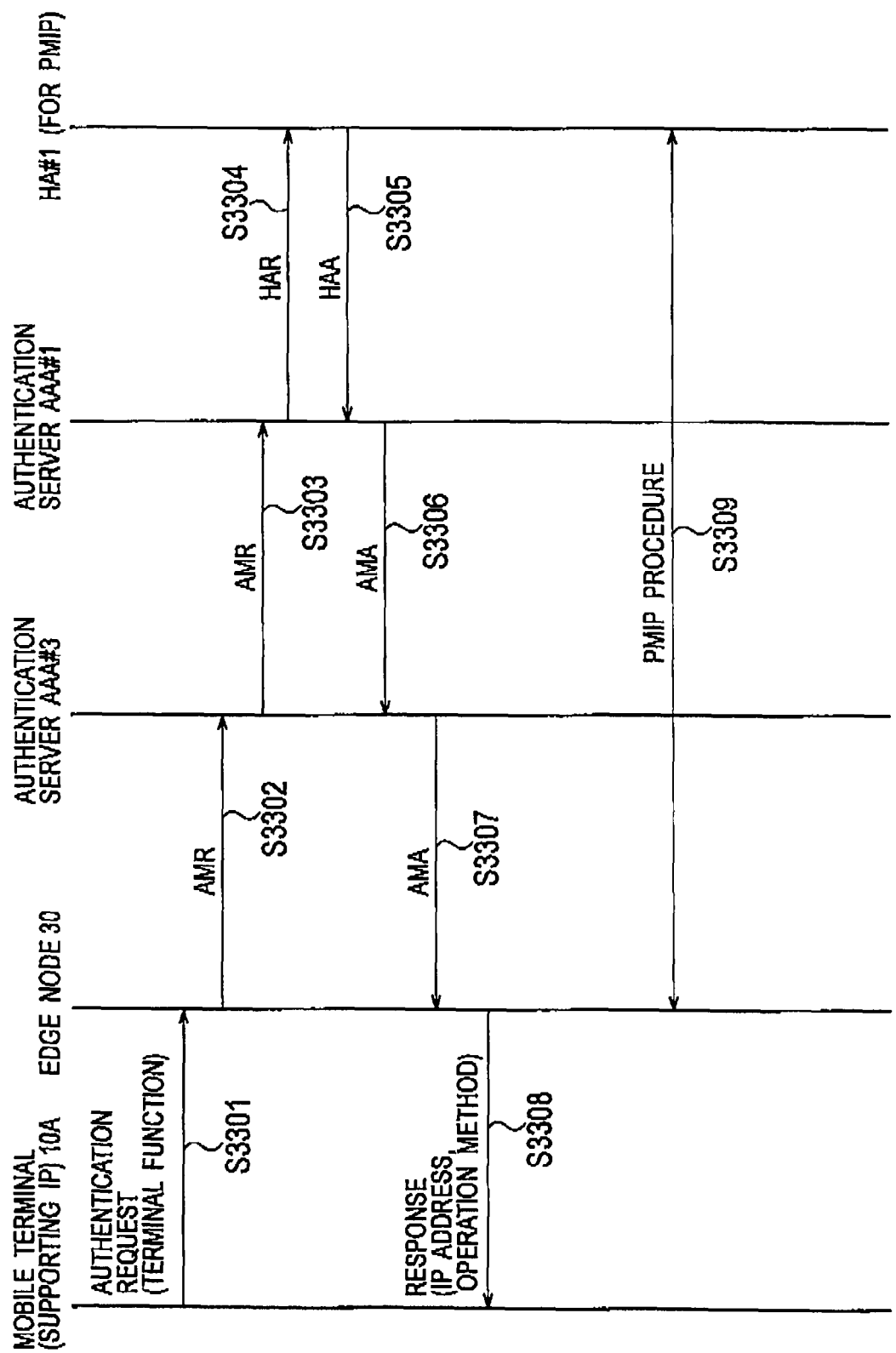
FIG. 19 is a sequence diagram showing operations of the mobile communication system according to the third embodiment of the present invention.

As shown in FIG. 19, in step S3301, the mobile terminal 10A transmits an authentication request (such as EPA-AKA) including the terminal function (only the IP function 14) provided to the mobile terminal 10A, to the edge node 30.

The operations of the following steps S3302 to S3309 are the same as the operations of the steps S3004 to S3011 shown in FIG. 16.

Fifthly, a fifth operation of the mobility management system according to the embodiment will be described with reference to FIG. 20. In an example of FIG. 20, the mobile terminal 10A does not have the MIP client function and has only the IP function, and a home address #2 of the mobile terminal 10A does not support the PMIP procedure and supports the MIP procedure.

Figure 20:
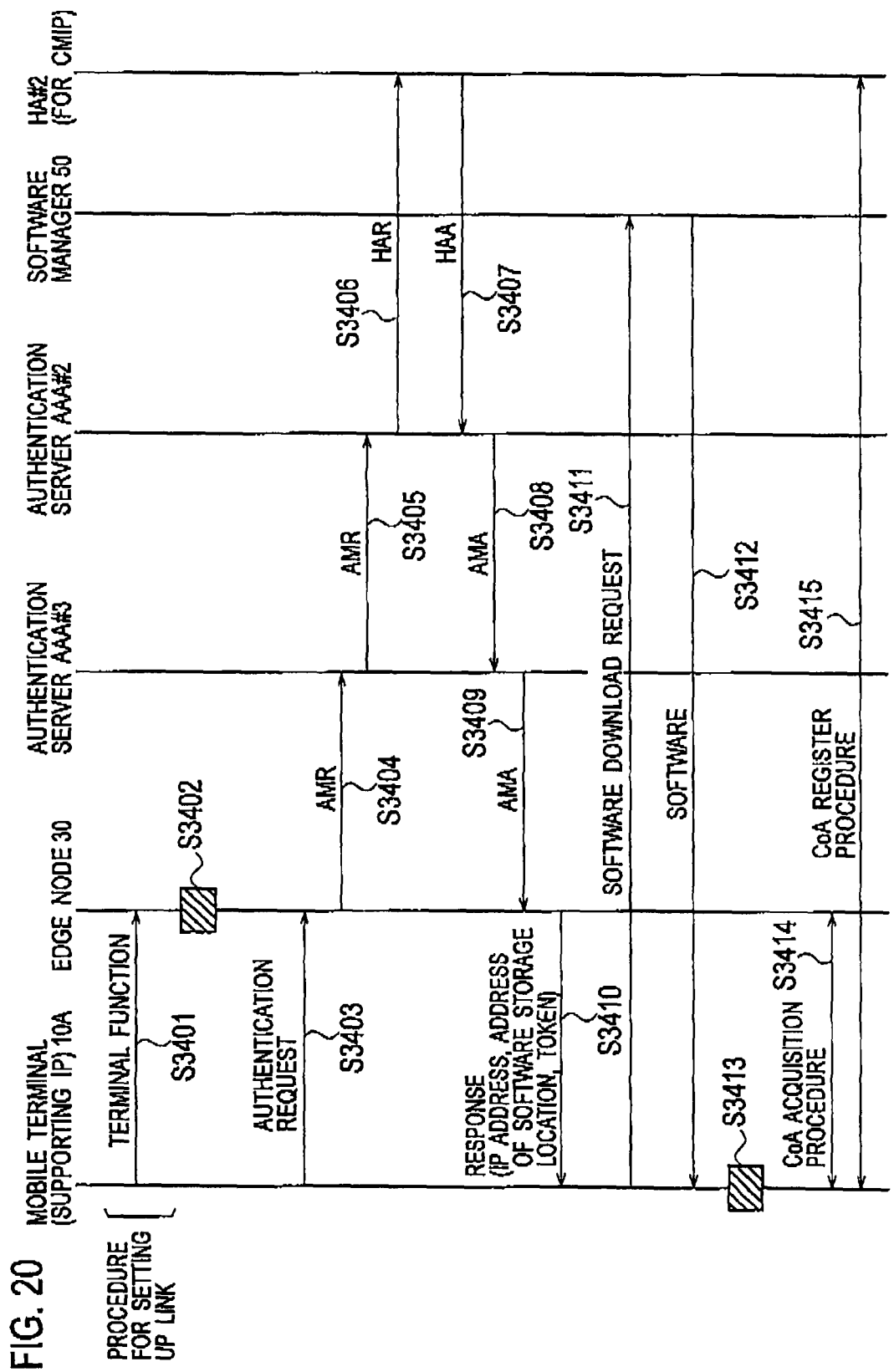
FIG. 20 is a sequence diagram showing operations of the mobile communication system according to the third embodiment of the present invention.

As shown in FIG. 20, in step S3401 in a procedure for setting link with the edge node 30, the mobile terminal 10A notifies the edge node 30 of the terminal function (only the IP function 14) provided to the mobile terminal 10A.

In step S3402, the edge node 30 stores therein the terminal function (only the IP function 14) provided to the mobile terminal 10A.

In step S3403, the mobile terminal 10A transmits an authentication request, such as EAP-AKA, to the edge node 30.

In step S3404, the edge node 30 transmits "AMR" to an authentication server AAA#3 provided in the visited network to request authentication processing for the mobile terminal 10A, and to inquire the home network #2 about which of the MIP procedure and the PMIP procedure the home network #2 can support. In step S3405, the authentication server AAA#3 transmits "AMR" to an authentication server #2 provided in the home network #2.

In step S3406, the authentication server AAA#2 transmits "HAR" to an HA#2 (for CMIP) to acquire registered information on the mobile terminal 10A, and in step S3407, the HA#2 (for CMIP) transmits "HAA" to the authentication server AAA#2 to notify the registered information on the mobile terminal 10A.

In step S3408, the authentication server AAA#1 transmits "AMA" to the authentication server AAA#3 to notify the result of the authentication performed by using the registered information on the mobile terminal 10A notified of by the HA#2 (for CMIP), and to notify ability of the home network #2 (the inquiry result indicating that the home network #2 can support the MIP procedure). In step S3409, the authentication server AAA#3 transmits "AMA" to the edge node 30.

In step S3410, the edge node 30 notifies the mobile terminal 10A of the result of the authentication processing for the mobile terminal 10A, and an IP address allocated to the mobile terminal 10A.

In addition, in step S3410, the edge node 30 notifies the mobile terminal 10A of a storage location of MIP client function software and a token, as well.

The operations of the following steps S3411 to S3415 are the same as the operations of the steps S2010 to S2014 shown in FIG. 12.

Sixthly, a sixth operation of the mobility management system according to the embodiment will be described with reference to FIG. 21. In an example of FIG. 21, the mobile terminal 10B has the MIP client function 13, and the home address #2 of the mobile terminal 10B does not support the PMIP procedure and supports the MIP procedure.

Figure 21:
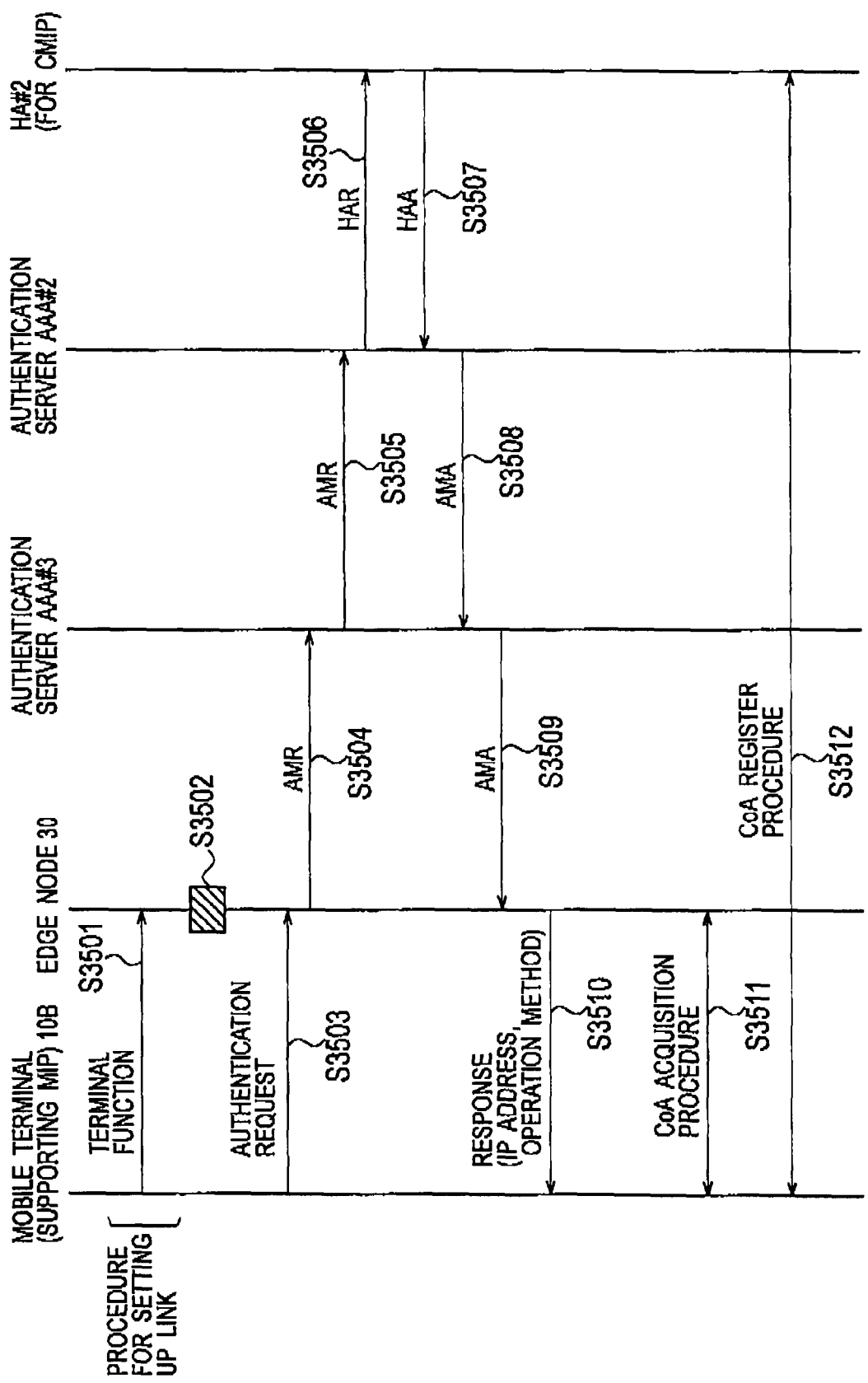
FIG. 21 is a sequence diagram showing operations of the mobile communication system according to the third embodiment of the present invention.

As shown in FIG. 21, in step S3501 in a procedure for setting link with the edge node 30, the mobile terminal 10B notifies the edge node 30 of the terminal functions (the MIP client function 13 and the IF function 14) provided to the mobile terminal 10A.

In step S3502, the edge node 30 stores therein the terminal functions (the MIP client function 13 and the IP function 14) provided to the mobile terminal 10A.

The operations of the following steps S3503 to S3509 are the same as the operations of the steps S3403 to S3409 shown in FIG. 21.

In step S3510, the edge node 30 notifies the mobile terminal 10B of the result of the authentication processing for the mobile terminal 10B, and an IP address allocated to the mobile terminal 10B.

In addition, in step S3510, the edge node 30 notifies the mobile terminal 10B of an operation method instructing the mobile terminal 10B to perform a mobility management operation by using the MIP client function 13.

In step S3511, the MIP client function 13 of the mobile terminal 10B acquires a foreign address (CoA) of the mobile terminal 10B allocated by the MIP FA function 30A of the edge node 30.

In step S3512, the MIP client function 13 of the mobile terminal 10B registers the foreign address of the mobile terminal 10B in the HA#2 (for CMIP).

Seventhly, a seventh operation of the mobility management system according to the embodiment will be described with reference to FIG. 22. In an example of FIG. 22, the mobile terminal 10B has the MIP client function 13, and the home address #2 of the mobile terminal 10B does not support the PMIP procedure and supports the MIP procedure.

Figure 22:
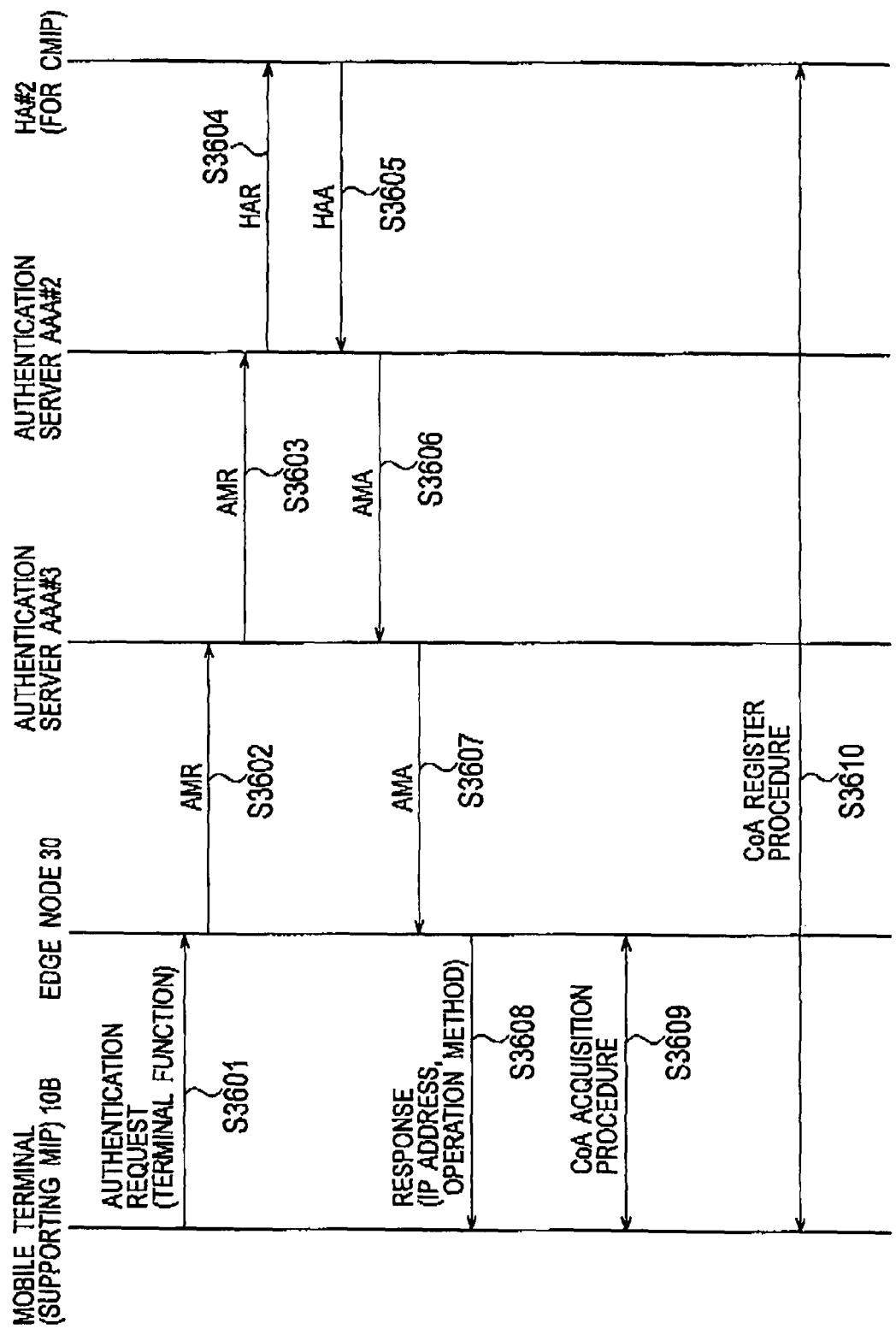
FIG. 22 is a sequence diagram showing operations of the mobile communication system according to the third embodiment of the present invention.

As shown in FIG. 22, in step S3601, the mobile terminal 10B transmits an authentication request (such as EAP-AKA) including the terminal functions (the MIP client function 13 and the IP function 14) provided to the mobile terminal 10B, to the edge node 30.

The operations of the following steps S3602 to S3610 are the same as the operations of the steps S3504 to S3512 shown in FIG. 21.

Eighthly, an eighth operation of the mobility management system according to the embodiment will be described with reference to FIG. 23. In an example of FIG. 23, the mobile terminal 10A does not have the MIP client function 13 and has only the IP function 14, and the home address #2 of the mobile terminal 10A does not support the PMIP procedure and supports the MIP procedure.

Figure 23:
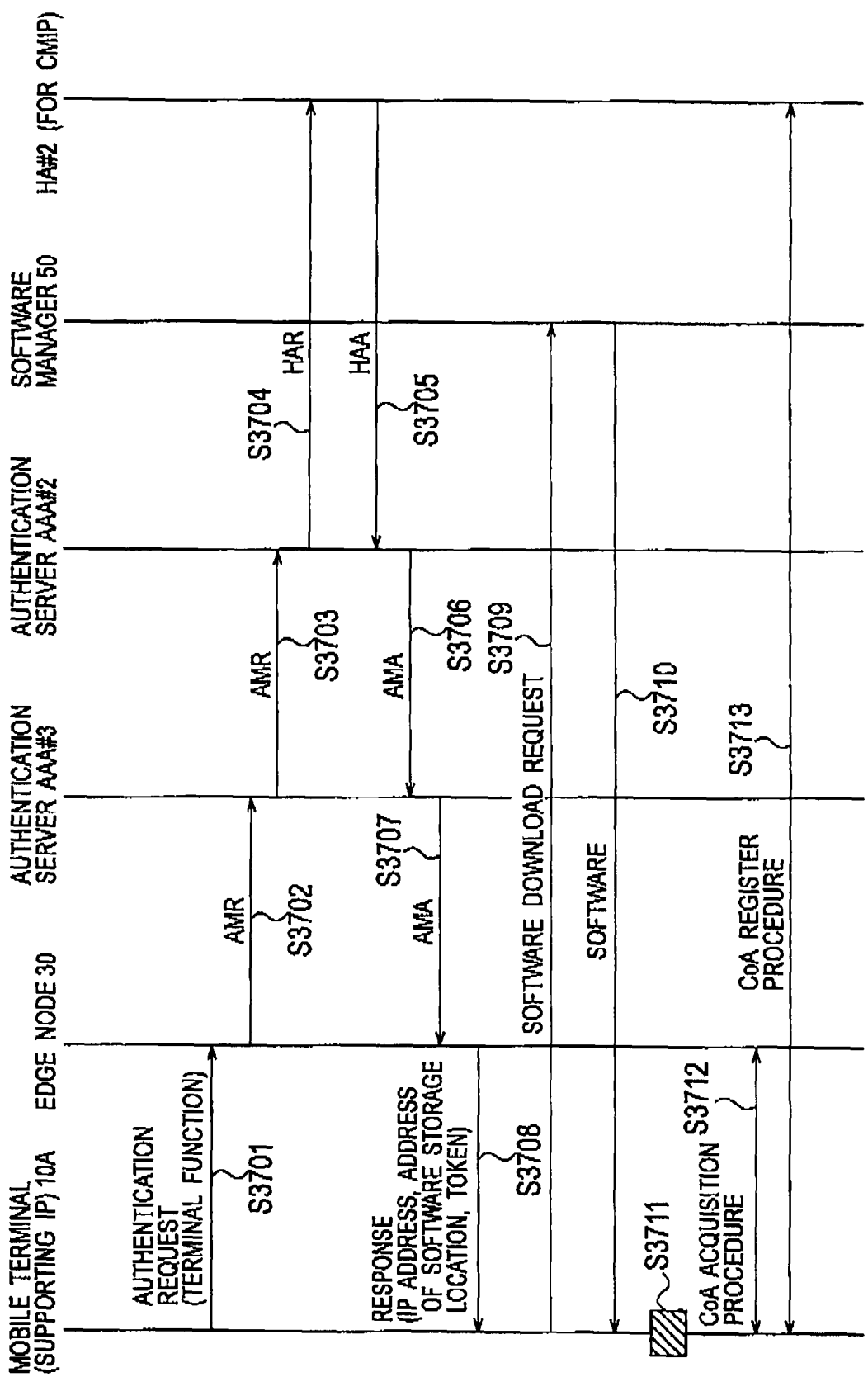
FIG. 23 is a sequence diagram showing operations of the mobile communication system according to the third embodiment of the present invention.

As shown in FIG. 23, in step S3701, the mobile terminal 10A transmits an authentication request (such as EAP-AKA) including the terminal function (only the IP function 14) provided to the mobile terminal 10B, to the edge node 30.

The operations of the following steps S3702 to S3713 are the same as the operations of the steps S3404 to S3415 shown in FIG. 20.

Advantageous Effects of the Mobility Management System According to the Third Embodiment of the Present Invention With the mobility management system according to the third embodiment of the present invention, the edge node 30 can determine a mobility management procedure depending on the ability of the home networks #1, #2 of the mobile terminals 10A, 10B.

Specifically, with the mobility management system according to the third embodiment of the present invention, security can be ensured by using the PMIP procedure for the mobile terminals 10A, B registered in the home network #1 that belongs to the same domain as the visited network, while security can be ensured by using the MIP procedure for the mobile terminals 10A, B registered in the home network #2 that belongs to a different domain from the visited network.

Although the present invention has been described in detail with the embodiments described above, it is obvious that the present invention shall not be limited to the embodiments described herein. The present invention can be modified without deviating from the intent and scope of the present invention defined by the claims. Therefore, the description in the specification shall be intended for illustrative purposes, and not have any limiting meaning to the present invention.

Note that the entire content of Japanese Patent Application No. 2007-000796 (filed on Jan. 5, 2007) is incorporated herein by reference.

INDUSTRIAL APPLICABILITY

As described above, the mobility management method and the network device according to the present invention can allow the network to take the initiative in determining a mobility management procedure to operate, and therefore are useful in radio communications such as mobile communications.

The invention claimed is:

1. A mobility management method for performing mobility management of a mobile terminal in a mobile communication network, the mobility management method comprising the steps of;
    notifying, at the mobile terminal, an edge node in a visited network in which the mobile terminal currently resides, of a terminal function indicating whether or not the mobile terminal has a Mobile IP client function;
    inquiring, at the edge node, a home network of the mobile terminal about which of a Mobile IP procedure and a Proxy Mobile IP procedure is supportable by the home network;
    instructing, at the edge node, the mobile terminal to perform an operation for the mobility management by using the Mobile IP client function or to perform the operation for the mobility management by using an IP function, on the basis of the inquiry result from the home network;
    performing, at the mobile terminal, the operation for the mobility management by using either the Mobile IP client function or the IP function, in response to the instruction from the edge node; and
    performing, at the edge node, the operation for the mobility management by using either the Mobile IP Foreign Agent function or the Proxy Mobile IP client function, depending on the inquiry result from the home network.

2. A network device being provided in a mobile communication network and performing mobility management of a mobile terminal, the network device comprising:
    a terminal function acquisition unit configured to acquire a terminal function from the mobile terminal, the terminal function indicating whether the mobile terminal has a Mobile IP client function;
    an inquiry unit configured to inquire a home network of the mobile terminal about which of a Mobile IP procedure and a Proxy Mobile IP procedure is supportable by the home network;
    an instruction unit configured to instruct the mobile terminal to perform the operation for the mobility management by using the Mobile IP client function or to perform the operation for the mobility management by using an IP function, on the basis of the inquiry result from the home network; and
    a mobility management operation unit configured to perform the operation for the mobility management by using either the Mobile IP Foreign Agent function or the Proxy Mobile IP client function, depending on the inquiry result from the home network.

* * * * *